(12) United States Patent
Singh

(10) Patent No.: US 9,251,554 B2
(45) Date of Patent: Feb. 2, 2016

(54) BLOCK-BASED SIGNAL PROCESSING

(71) Applicant: ANALOG DEVICES, INC., Norwood, MA (US)

(72) Inventor: Raka Singh, Bangalore (IN)

(73) Assignee: ANALOG DEVICES, INC., Norwood, TX (US)

( * ) Notice: Subject to any disclaimer, the term of this patent is extended or adjusted under 35 U.S.C. 154(b) by 473 days.

(21) Appl. No.: 13/727,208

(22) Filed: Dec. 26, 2012

(65) Prior Publication Data

US 2014/0176571 A1 Jun. 26, 2014

(51) Int. Cl.
*G06F 15/17* (2006.01)
*G06T 1/20* (2006.01)

(52) U.S. Cl.
CPC .................................... *G06T 1/20* (2013.01)

(58) Field of Classification Search
CPC ........................................................ G06T 1/20
USPC ........................................................ 345/501
See application file for complete search history.

(56) References Cited

U.S. PATENT DOCUMENTS

| 4,796,179 | A | 1/1989 | Lehman et al. |
| 4,809,005 | A | 2/1989 | Counselman, III |
| 4,831,580 | A | 5/1989 | Yamada |
| 5,043,981 | A | 8/1991 | Firoozmand et al. |
| 5,072,420 | A | 12/1991 | Conley et al. |
| 5,280,617 | A | 1/1994 | Brender et al. |
| 5,287,511 | A | 2/1994 | Robinson et al. |
| 5,291,459 | A | 3/1994 | Andersen |
| 5,422,833 | A | 6/1995 | Kelem et al. |
| 5,481,741 | A | 1/1996 | McKaskle et al. |
| 5,612,866 | A | 3/1997 | Savanyo et al. |
| 5,748,202 | A | 5/1998 | Nakatsuka et al. |
| 5,818,736 | A | 10/1998 | Leibold |
| 6,064,819 | A | 5/2000 | Franssen et al. |
| 6,128,307 | A | 10/2000 | Brown |
| 6,138,270 | A | 10/2000 | Hsu |
| 6,317,804 | B1 | 11/2001 | Levy et al. |
| 6,567,957 | B1 | 5/2003 | Chang et al. |
| 6,588,004 | B1 | 7/2003 | Southgate et al. |
| 6,591,402 | B1 | 7/2003 | Chandra et al. |

(Continued)

FOREIGN PATENT DOCUMENTS

| EP | 1734442 | 5/2005 |
| EP | 2093667 | 12/2006 |

(Continued)

OTHER PUBLICATIONS

Shift buffering technique for automatic code synthesis from synchronous dataflow graphs Dutt, N.; Soonhoi Ha; Hyunok Oh Hardware/Software Codesign and System Synthesis, 2005. CODES+ISSS '05. Third IEEE/ACM/IFIP International Conference on Year: 2005.*

(Continued)

*Primary Examiner* — Javid D Amini
(74) *Attorney, Agent, or Firm* — Patent Capital Group

(57) ABSTRACT

Signal flows for data-processing applications may be implemented so as to enable each processing node in the flow when it contains a sufficient amount of input data at its input buffer. In various embodiments, such signal flows can be graphically defined in a GUI tool which, thereafter, auto-generates suitable code for implementing the signal flow.

29 Claims, 10 Drawing Sheets

(56) References Cited

U.S. PATENT DOCUMENTS

| | | | |
|---|---|---|---|
| 6,614,796 B1* | 9/2003 | Black et al. | 370/403 |
| 6,701,391 B1 | 3/2004 | Ayat et al. | |
| 6,704,467 B2 | 3/2004 | Uchida | |
| 6,738,964 B1 | 5/2004 | Zink et al. | |
| 6,813,279 B1* | 11/2004 | Trainin | 370/466 |
| 7,042,910 B2* | 5/2006 | Ang et al. | 370/503 |
| 7,107,199 B2* | 9/2006 | Schreiber et al. | 703/13 |
| 7,110,936 B2 | 9/2006 | Hiew et al. | |
| 7,191,342 B1* | 3/2007 | New et al. | 713/190 |
| 7,243,193 B2 | 7/2007 | Walmsley | |
| 7,280,758 B2* | 10/2007 | Doh et al. | 398/59 |
| 7,320,121 B2 | 1/2008 | Krueger | |
| 7,353,146 B2 | 4/2008 | Zarrinkoub et al. | |
| 7,478,016 B2* | 1/2009 | Orofino et al. | 703/2 |
| 7,590,644 B2* | 9/2009 | Matsakis et al. | 1/1 |
| 7,606,943 B2 | 10/2009 | Ramchandran | |
| 7,624,375 B2 | 11/2009 | Santori et al. | |
| 7,797,561 B1 | 9/2010 | Abdalla et al. | |
| 7,802,118 B1 | 9/2010 | Abdalla et al. | |
| 7,888,580 B2 | 2/2011 | Okano et al. | |
| 7,913,222 B2 | 3/2011 | Ogilvie et al. | |
| 8,026,739 B2 | 9/2011 | Sullam et al. | |
| 8,046,386 B2 | 10/2011 | Taitel | |
| 8,060,729 B1 | 11/2011 | Perry et al. | |
| 8,069,436 B2 | 11/2011 | Snyder et al. | |
| 8,250,342 B1 | 8/2012 | Kostarnov et al. | |
| 2002/0054591 A1* | 5/2002 | Oyama | 370/386 |
| 2003/0051223 A1 | 3/2003 | Wheeler et al. | |
| 2004/0117167 A1 | 6/2004 | Neifert et al. | |
| 2007/0266329 A1 | 11/2007 | Gaudette | |
| 2008/0288518 A1 | 11/2008 | Matsuo et al. | |
| 2009/0019416 A1 | 1/2009 | Chugh et al. | |
| 2009/0064082 A1 | 3/2009 | Tsapepas et al. | |
| 2009/0077532 A1 | 3/2009 | Denney | |
| 2010/0199141 A1 | 8/2010 | Parkvall et al. | |
| 2011/0225524 A1 | 9/2011 | Cifra | |
| 2012/0030655 A1 | 2/2012 | de Castillo | |

FOREIGN PATENT DOCUMENTS

| | | |
|---|---|---|
| JP | 2007/079838 | 3/2007 |
| JP | 2008/084261 | 4/2008 |
| JP | 2008/171305 | 7/2008 |
| JP | 2008/277365 | 11/2008 |
| JP | 2009/015557 | 1/2009 |
| JP | 2009/193181 | 8/2009 |
| KR | 100224379 | 7/1999 |
| KR | 102011040224 | 10/2009 |
| WO | 01/46837 | 6/2001 |
| WO | 2006/034350 | 3/2006 |
| WO | 2008/033344 | 3/2008 |
| WO | 2012/009295 | 1/2012 |

OTHER PUBLICATIONS

Richard Thavot et al., "Dataflow design of a co-processor architecture for image processing", Conference on Design and Architectures for Signal and Image Processing, DASIP 2008, Belgium, Nov. 24-26, 2008, 2004-2014 EPFL tous droits reserves, 9 pages.

Free DSP graphical software development tool automatically generates prototyping code, www.electronics-eetimes.com, Jul. 30, 2010, 2 pages.

Hyunok Oh et al., "Shift buffering technique for automatic code synthesis from synchronous dataflow graphs", CODES+ISSSS'05, Sep. 19-21, 2005, Jersey City, NJ, USA, © 2005 ACM 1-59593-161-9/05/0009, 8 pages.

"Automatic code generation, a.k.a. "Auto-code"", file:///CI/PrecisionMBA/Website/automatic_code_generation.htm (1 of 4) Feb. 10, 2006, 4 pages.

Ewen Denney et al., "Generating Code Review Documentation for Auto-Generated Mission-Critical Software", Jul. 19, 2009, IEEE Computer Society, Washington, DC, USA © 2009, ISBN: 978-0-7695-3637-8 doi, pp. 394-401.

Notice of Preliminary Rejection issued in Korean Patent Application Serial No. 10-2013-0164508 mailed Aug. 17, 2015, 5 pages.

English Summary of Notice of Preliminary Rejection issued in Korean Patent Application Serial No. 10-2013-0164508 mailed Aug. 17, 2015, 5 pages.

* cited by examiner ns, which generally require higher sample-processing rates, e.g., because a single image already contains a large number of data samples (i.e., pixels), and which, further, often include processing steps that operate on collections of samples (rather than on individual samples). For example, an image-smoothing step may involve replacing each pixel with an average over a block of several pixels, and a one-dimensional Fourier transform inherently requires an entire row of the input image for each pixel of the output image. Other tools operate on entire image frames. Processing complete image frames is, however, unnecessary in many circumstances. Further, in real-world image-processing applications implemented on DSPs or other special-purpose processors with limited local memory (rather than on a general-purpose computer), frame-based architectures require frequent accesses to external (off-chip) memory that render the system inefficient.

Accordingly, there is a need for signal-flow architectures that facilitate efficient image processing on DSPs and other hardware subject to memory and bandwidth limitations, as well as for tools that aid application developers in implementing such signal flows.

BLOCK-BASED SIGNAL PROCESSING

TECHNICAL FIELD

The present invention relates, in general, to signal-flow architectures for image- and other data-processing applications and, in some embodiments, to tools for generating program code that implements signal flows based on graphical representations thereof.

BACKGROUND

Image-processing applications typically include multiple functional processing blocks, hereinafter referred to as "nodes," that are executed sequentially to convert raw image data into the final images presented to the user and/or to analyze the image data to extract information about conditions or objects they capture. In such applications, the algorithm that governs the required signal flow connecting the nodes (i.e., manages the input, output, temporary data storage and data transfer for the various functional blocks) generally forms the core of the application, and often consumes a significant part of the processing power—in particular, when implemented on a digital signal processor (DSP) or in hardware. FIG. 1 illustrates an exemplary signal flow of an algorithm for foreground "blob" detection, which may be used, e.g., to detect people, vehicles, or other objects in images. The first node 100 ('ABS DIFF') computes the pixel-wise difference in image values (e.g., grayscale-values) between an image and a background reference image. In the second node 102 ('BINARY THRESHOLD'), the difference thus computed is thresholded against a fixed or adaptive threshold to produce a binarized image. The binarized image undergoes further post-processing in the 'EROSION' and 'DILATION' nodes 104, 106 to erode away noisy pixels and to enhance the binary image output. The final node 108 ('CONNECTED LABELLING') identifies connected pixels in the binary image and labels them as "blobs."

Developing suitable program code to implement the signal and data flow (whether written in a low-level DSP language or a high-level language such as C or C++) is generally a daunting task for the algorithm or application programmer, and involves many levels of design optimization related to memory allocation, direct memory access, control, etc. It is, therefore, desirable to automate or semi-automate this task. There are programming tools available that auto-generate code from a diagrammatic representation of a signal flow created by the application developer in a graphical user interface (GUI). These tools generally support either sample-based or frame-based signal-flow architectures, where the processing nodes operate on individual data samples or entire frames, respectively. Sample-based tools are widely used for, e.g., audio-signal processing and motor control. However, they may be unsuitable for many image-processing applications, which generally require higher sample-processing rates, e.g., because a single image already contains a large number of data samples (i.e., pixels), and which, further, often include processing steps that operate on collections of samples (rather than on individual samples). For example, an image-smoothing step may involve replacing each pixel with an average over a block of several pixels, and a one-dimensional Fourier transform inherently requires an entire row of the input image for each pixel of the output image. Other tools operate on entire image frames. Processing complete image frames is, however, unnecessary in many circumstances. Further, in real-world image-processing applications implemented on DSPs or other special-purpose processors with limited local memory (rather than on a general-purpose computer), frame-based architectures require frequent accesses to external (off-chip) memory that render the system inefficient.

Accordingly, there is a need for signal-flow architectures that facilitate efficient image processing on DSPs and other hardware subject to memory and bandwidth limitations, as well as for tools that aid application developers in implementing such signal flows.

SUMMARY

The present invention relates to signal-flow architectures that facilitate block-based data (in particular, image) processing and overcome many of the deficiencies of sample-based and frame-based signal flows. Block-based signal processing generally serves to reduce the memory requirements associated with individual processing steps and the frequency of external-memory accesses, resulting in overall efficiency increases compared with frame-based processing. A data "block," as used herein, is a collection of data samples that form a subset of a more complete data set, referred to as a "frame." For example, an image frame contains the entirety of the visual data samples acquired by a camera or other optical detector at a given point in time, and typically forms a two-dimensional matrix or array of image pixels (although one- or three-dimensional visual data sets are also within the scope of the term "image frame"). An image block may consists, for example, of one or more rows or columns of the image frame, or of a sub-array that spans portions of multiple rows and/or columns surrounding a particular pixel. Although image processing is one of the major applications of block-based signal processing, and is extensively used throughout this specification for illustration purposes, it should be understood that the invention is not limited to image data, but applies generally to any type of data amenable to block-based processing (including, e.g., measurements or simulations of discretized physical fields, or multi-channel audio signals).

Signal flows in accordance herewith generally include a plurality of nodes, where each node corresponds to a functional unit, i.e., the performance of a particular processing function on the input data block. The nodes may generally be implemented in hardware (i.e., circuitry), software (i.e., executable sets of instructions), or a combination of both. In software implementations, each node corresponds, in some embodiments, to a separate functional block or set of instructions executed by a processor; in some embodiments, one or more of the nodes are each implemented by multiple blocks of instructions; and in some embodiments, two or more nodes are implemented together by a single block of instructions. Similarly, in hardware implementations, each node may correspond to a single, dedicated circuit; multiple nodes may be implemented by a multi-functional circuit; and/or multiple separate circuits may collectively implement a single node. Depending on context, the term "node" may hereinafter refer to the processing step or function itself, or to its implementation in hardware and/or software.

In block-based signal flows, the block size required at a node to produce one unit of output (where a unit may be an individual sample or a block of data) may differ between the nodes. For example, in image-processing applications, one image-processing step may operate on one row of input to produce one row of output, whereas another step may require three rows of input for each row of output. The nodes generally have associated input buffers for storing the requisite amount of data. In some embodiments, each node is triggered as soon as sufficient data is available in its input buffer to produce one unit of output; overall local-memory requirements as well as wait times are, thus, minimized. In embodiments where a single processor or circuit executes multiple nodes, each node with sufficient data in its input buffer is enabled for execution and is executed as soon as the processor's or circuit's computational capacity permits. A buffer, as used herein, denotes any means for data storage, and may be implemented in any kind of storage medium, device, or structure, including, for example, one or more partitions or sections in a random-access memory, hardware registers, flip-flops, latches, or any combination thereof. The buffer need not be a single, contiguous unit, but may comprise multiple portions in different memory locations. Further, it may store data directly, or indirectly via pointers to separate memory locations.

In addition to block-based data-processing methods and hardware to implement them, the present invention provides, in various embodiments, GUI-based tools that enable application developers to define signal flows graphically, and auto-generate suitable program code based on the graphical signal-flow representation. Such tools generally include a library of functional data-processing blocks (i.e., nodes), an editor for drawing a signal flow incorporating nodes from the library, a compiler for generating code from the signal flow, and, optionally, a simulator for executing and testing the code.

In a first aspect, the invention provides a method for processing data frames (such as, e.g., image frames) by a series of processing nodes, each node being configured to process a block of input data—where each block includes a plurality of samples and constitutes a portion of a frame (e.g., a number of rows of the image frame)—to produce one unit of output (e.g., one row of the image frame). The method includes receiving data at input buffers associated with the nodes, and causing execution of each node when its associated input buffer stores enough data to produce one unit of output. Execution of a node may be caused directly, by triggering it as soon as the input buffer has sufficient data; this may be the case, e.g., in embodiments where the node has a dedicated circuit, processor, or other computational unit that merely awaits the trigger signal before beginning processing. Alternatively, execution of a node may be caused indirectly, by changing the state of the node such that processing is enabled or allowed. In that case, the node will be processed as soon as the processor implementing the series of nodes has free capacity.

In a second aspect, the invention provides a method of controlling signal flow in a data-processing system implementing a series of processing nodes, where each node is configured to produce one unit of output data (e.g., one row of data) from an input data block including a node-specific integer-multiple of one unit of input data. The method involves controlling the signal flow through the series of nodes by receiving data at input buffers associated with the nodes, and causing execution of each node (i.e., triggering or enabling the node) if the input buffer associated therewith stores the respective node-specific integer-multiple of one unit of data.

At each processing node, data may be received from a preceding node and/or a DMA source node. In some embodiments, the first processing node in the series reads data from a DMA source node and the last processing node in the series writes data to a DMA sink node. In certain embodiments, a counter is maintained for each input buffer; the method then involves incrementing the counter for each unit of input data received from a preceding processing node or DMA source node. In some embodiments, memory allocated to a buffer associated with one of the processing nodes is be re-used for a buffer associated with a node downstream thereof. The processing nodes may be executed in parallel or sequentially.

In a third aspect, the invention provides a system for processing data frames by a series of processing nodes. Each node is configured to process a node-specific block of input data to produce one unit of output data, and each block includes a plurality of data samples and is a portion of a data frame. The system includes one or more processing blocks implementing the series of processing nodes, a plurality of input buffers associated with the nodes, and a logic switching mechanism for causing execution of each node by the respective processing block when the input buffer associated therewith stores the node-specific block of input data. In some embodiments, the system includes a plurality of processing blocks, each corresponding to one of the processing nodes.

The processing block(s) may be implemented with processor-executable instructions stored in memory. Alternatively, the processing block(s) may be implemented in circuitry. In some embodiments, a single circuit is provided for executing the series of processing nodes sequentially, and in some embodiments, a plurality of circuits is provided for executing the processing nodes (whose execution has already been caused or enabled by the logic switching mechanism) in parallel. A "circuit," as used herein in this context, may be a processor core, a self-contained portion of a core, an arithmetic logic unit, or generally any other functional processing unit. The switching mechanism may include a plurality of registers storing, for each node, a number of input units associated with the node-specific block of that node and a counter for a number of input units presently stored in the buffer associated with that node. The registers may be hardware registers, or may be stored in local memory associated with the processing block(s). In some embodiments, the system is a digital signal processor.

In a fourth aspect, the invention provides a system for generating program code for block-based signal processing from a graphical representation of a signal flow defined in a graphical user interface. The system includes a processor, memory storing instructions executable by the processor, and optionally a display device (e.g., a computer screen) for displaying the graphical user interface. The instructions stored in memory include (i) a library of functions implementing signal-processing nodes, each node being configured to produce one unit of output data from a block of input data having a node-specific size, (ii) instructions implementing an editor allowing a user to graphically define a signal flow comprising a plurality of nodes and connections therebetween, and to associate with each of the nodes one of the functions from the library, and (iii) instructions implementing a compiler for generating the program code from the graphically defined signal flow and the associated functions, the code causing execution of each node when a buffer associate with that node stores a block of input data of the respective node-specific size. The editor may further allow the user to graphically define direct memory access (DMA) of the signal flow, including, e.g., DMA sources, DMA sinks, and/or DMA scheduling paths, and the compiler may further generate program code implementing the graphically defined DMA. If the user does not define the scheduling paths, the compiler may automatically generate the DMA scheduling paths. The compiler may further generate program code resolving data parallelism in DMA paths and assigning ping-pong buffers at source node buffers and sink node buffers, as well as code implementing the buffers associated with the nodes at different levels of a memory hierarchy. The editor may allow the user to enter parameters into a DMA parameter window, and the compiler may generate DMA register entries based on the parameters.

BRIEF DESCRIPTION OF THE DRAWINGS

The foregoing will be more readily understood from the following detailed description of the invention, in particular, when taken in conjunction with the drawings, in which.

DETAILED DESCRIPTION

Figure 1:
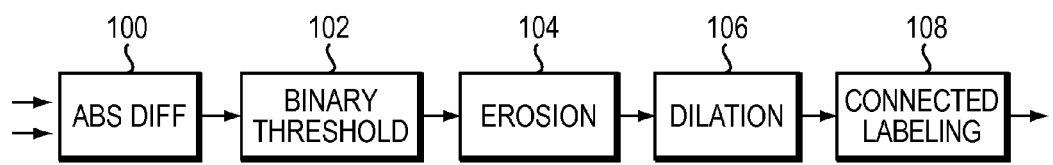
FIG. 1 is a conventional signal flow diagram for an exemplary image-processing application.
Figure 2A:
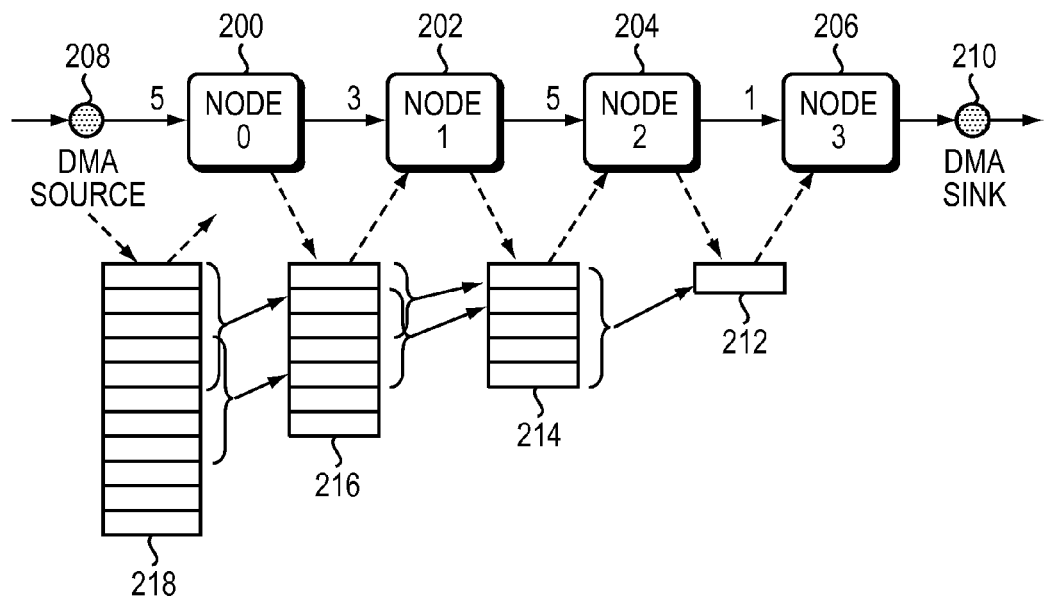
FIG. 2A is a conceptual signal flow diagram illustrating buffer requirements associated with each node in one implementation of row-based signal processing.
Figure 2B:
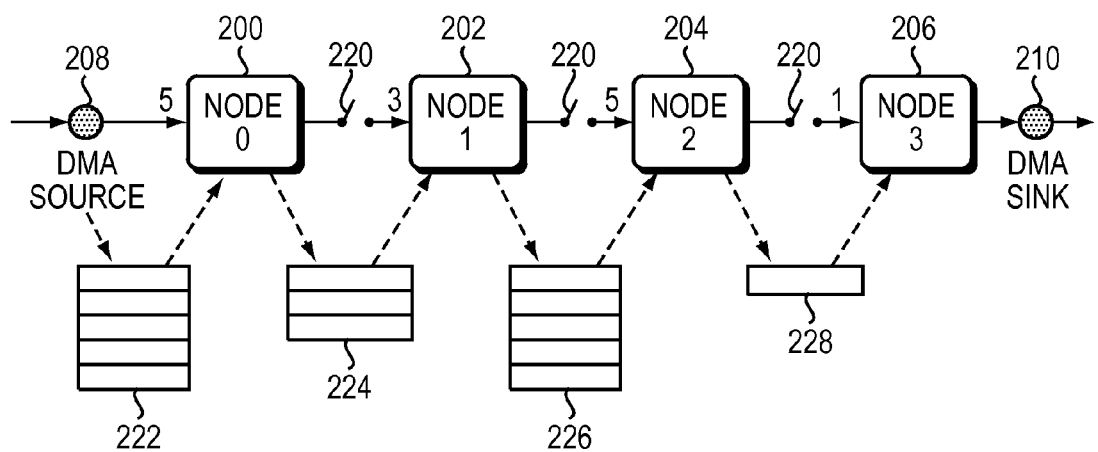
FIG. 2B is a conceptual signal flow diagram illustrating reduced buffer requirements associated with the nodes in a row-based signal processing implementation incorporating switches between the nodes in accordance with one embodiment of the invention.

Data-processing algorithms in accordance with various embodiments operate on blocks of data, rather than data samples or entire frames. Such blocks may consist, for example, of one or more rows of a two-dimensional data array or of one or more slices of a three-dimensional array. Row-based data processing is suitable, or even necessary, in many image-processing applications, e.g., to perform two-dimensional filtering such as convolution or two-dimensional morphology filtering such as erosion and dilation. FIGS. 2A and 2B illustrate signal flows for an exemplary row-based algorithm that includes four nodes 200, 202, 204, 206, or processing steps, each converting a certain number of input rows (indicated to the left of the node) into one row of output data. For successive output rows, the corresponding blocks of multiple input rows overlap such that each frame of input data results in an equally sized frame of output data. For example, row n of the output frame may be generated from rows n−1, n, and n+1 of the input frame, such that the three-row input blocks for two adjacent output rows overlap by two rows. (The input frame may be "padded," e.g., with zeros, to provide the input data required around the margin of the frame. Alternatively, if the input frame itself is not padded, the nodes will generate the padded zeros to fill in the buffers.)

In the illustrated signal flow, the first node 200, "node 0," receives input data via direct memory access (DMA) from a DMA source node 208, and the last node 206, "node 3," writes output data via direct memory access to a DMA sink node 210. Each node has an associated buffer at its input for temporarily storing the output from the immediately preceding node. In one embodiment, illustrated in FIG. 2A, the buffers are sized so as to store enough data to generate one row of output at node 3. Node 3 requires one row of input to produce one row of output data; accordingly, its buffer 212 is configured to store one row of data. Node 2 needs five input rows for one row of output and, thus, requires a buffer 214 storing five rows of data. Node 1 needs three rows of input to produce one row of output. In order to produce the five rows of input required by node 2, however, node 1 requires a total of seven rows of input data: rows 1-3 yield the first row of output, rows 2-4 the second row of output, rows 3-5 the third row of output, rows 4-6 the fourth row of output, and rows 5-7 the fifth row of output. Consequently, the input buffer 216 at node 1 is configured to store seven rows. Similarly, node 0 needs five rows of input to generate one row of output, but in order to provide the seven rows of data needed by row 1, it requires a buffer 218 storing a total of eleven rows of input (rows 1-5 for the first row of output, rows 2-6 for the second row of output, etc.). In general, a node that produces one row of output from n rows of input, and which precedes a node requiring a total of m rows of input, needs a buffer storing n+m−1 rows. Thus, the requisite number of input rows cascades up to the source node 208. For signal flows that involve large numbers of nodes, the resulting buffer requirements can exceed the capacity of local memory, necessitating external-memory accesses, which block-based processing was intended to eliminate.

FIG. 2B shows a modified signal flow that ameliorates the memory problem. Here, the data flow is controlled by a control signal flow that triggers each node as soon as the input buffer of the node contains a sufficient amount of data to produce one row of output—conceptually, this is illustrated with switches 220, each connecting the output of a predecessor node with the input of the next node, that close when sufficient data is available at the input buffer of the next node. Thus, when node 1, for example, has received three nodes of input, it processes these rows to generate a row of output that it stores in the input buffer of node 2. The input buffer of node 1 may then be overwritten. Specifically, the second and third row in the input buffer may be shifted up by one (overwriting the first row), and the next row of input may be received (from node 0) and stored in the third row of the input buffer of node 1. In this manner, the requisite buffer size at each node is reduced to the number of input rows the node needs to produce one row of output; in the example of FIG. 2B, nodes 0, 1, 2, and 3, would have buffers 222, 224, 226, 228 for five rows, three rows, five rows, and one row, respectively. As will be readily apparent to a person of ordinarily skill in the art, the cascading effect from which the signal flow of FIG. 2A suffers is, thus, eliminated, and the overall buffer requirement is approximately proportional to the number of nodes, or less if buffers can be shared between nodes (as explained below). The buffers for the various nodes may, generally, be implemented at different levels of the memory hierarchy, depending on the buffer size and the required frequency of access. For example, the smallest buffers (for single rows of data) may be implemented in L1 memory, whereas larger buffers may be implemented in L2 or L3 memory or cached memory (which are associated with greater latencies).

The signal flow shown in FIG. 2B can be executed using a single processor. In this case, the processor is controlled to always execute, among the nodes that have enough data available at their input buffers, the node that is farthest toward the DMA sink node 210. For example, starting with a new data frame at the input, node 0 executes three times to produce the minimum data amount required by node 1. The switch between nodes 0 and 1 then closes, and node 1 executes to produce one row of output. Thereafter, the second and third rows in the input buffer of node 1 are shifted up by one row, and node 0 runs again to produce the third row of data for the input buffer of node 1. Next, node 1 is executed again to generate the second row of data for the input buffer of node 2.

This process is repeated three more times, until five rows of input are available at node 2, at which time node 2 executes, followed by node 3. The processor then returns to node 0, and the whole loop iterates until the entire input data frame has been processed. During each loop, memory may be re-used among the nodes, i.e., buffer space may be shared. For example, the output row of node 2 may be stored in the memory previously allocated to the input buffer of node 1. (If that buffers still stores the three already processed rows, the first row may be overwritten by the output of node 2, as it will be no longer needed. On the other hand, if previous rows 2 and 3 of the input buffer of node 1 have already been copied to rows 1 and 2, the third row of that buffer may be used to store the output of node 2.)

In some embodiments, the various nodes of the signal flow are executed in parallel by multiple processors, or by a single processor running multiple threads simultaneously (e.g., in a time-shared, interleaved fashion). In this scenario, memory re-use among the buffers is not possible, but total execution time can be drastically reduced, as each node executes repeatedly as long as the switch at its input is closed, i.e., as long as enough data is available in its input buffer. Typically, once the buffer between two nodes has filled (e.g., the input buffer of node 1 has received three rows of input) and the switch between the nodes has closed, the buffer is filled from one end and drained from the other end at the same rate, and the switch remains closed until the entire frame has been processed. In other words, following initial buffer filling, data movement through the nodes occurs in a pipelined manner.

The signal flow illustrated in FIG. 2B can be modified in several ways. In addition to including more (or fewer) processing nodes with different data input requirements than those shown, the signal flow may include and/or connect to additional DMA source and/or sink nodes. In general, each node in the signal flow may read data in from memory (i.e., be a source node) or write data out to memory (i.e., be a sink node). Further, the nodes in the signal flow need not necessarily form a linear chain. In some applications, the signal flow includes two or more parallel nodes, i.e., nodes that process input data independently, and whose collective outputs may be required by another node further downstream in the signal flow. Of course, the signal flow can, in principle, branch and recombine in arbitrarily complex ways. Moreover, in some embodiments, certain nodes may be optional. For example, in a typical image-processing application, a node for reducing the resolution and, consequently, size of image frames may or may not be executed, depending on a setting specified, e.g., by the user of the application. To implement such an optional node, the signal flow may include a by-pass around the node, e.g., utilizing the "switches" at the input and output of the node and additional control signal lines that determine the switch settings based on the user selection (or some other condition, e.g., the numerical value of a metric derived from a previous processing step).

Although illustrated above at the example of row-based processing, the use of "switches" to trigger the operation of nodes can generally be applied to any kind of block-based processing, regardless of the particular form and size that the data blocks take. The key is that each node within the signal flow is triggered to execute when a sufficient amount of data has been received in its input buffer to produce one unit of output, where the size of the unit depends on the particular application. Consider, for example, an image-smoothing step (i.e., node) that replaces the value of each pixel by the average value of a 3×3 block of pixels centered at the pixel at issue. This node has an output unit size of only one pixel; it executes when it has a 3×3 block—e.g., corresponding to a block centered at coordinates (n,m) of the image frame—in its input buffer, and writes the computed output value to the input buffer of the next node, in a manner that preserves the coordinates (n,m) of the pixel. The next 3×3 block processed by the node may be shifted by one column to the right (i.e., centered at (n,m+1) in the image frame), and the computed output may, accordingly, be stored in association with coordinates (n,m+1) in the input buffer of the immediately following node.

The size of the input data block for each node is generally an integer-multiple of the size of the output unit from the immediately preceding node (or, if a node takes input from a group of preceding nodes, the combined output unit size of the preceding group of nodes) such that repeated execution of the preceding node(s) can generate the requisite amount of data for the input block. In various embodiments, the output unit size is the same for all nodes. For example, in the signal flow of FIG. 2B, the output unit of each node is one row of data, and the input data blocks required by the nodes all consist of an integer number of rows. The use of a single output unit for all nodes can simplify programming the signal flow and also the DMA movement of data in the signal flow, without necessitating saving state variables for every node, as are required for other block-based processing approaches, such as 8×8 overlap blocks across column boundaries. (In 8×8 overlap block processing (in contrast to row-based processing where the node will operate on a buffer of size 8×M, where M is the number of pixels in one row of the image), the overlap requires, for the next 8×8 data block to be processed, that the previous column from the previous 8×8 block has been saved as a state variable in that node.)

Figure 3:
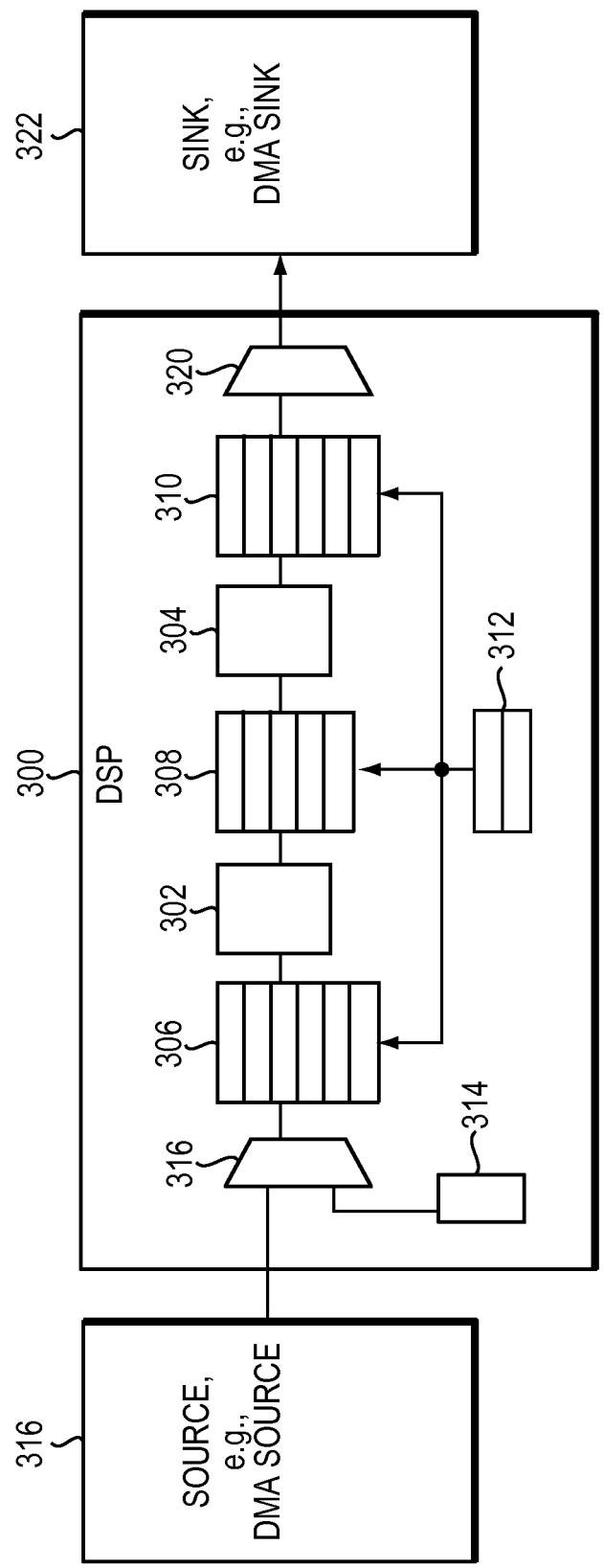
FIG. 3 is a block diagram illustrating a system for row-based signal processing in accordance with various embodiments.

FIG. 3 illustrates an exemplary DSP implementation of block-based signal-processing flows such as the one shown in FIG. 2B. The DSP 300 implements each node of the signal flow with separate hardware (labeled "processing block"), such as a dedicated logic unit or processor core; thus, in the illustrated embodiment, the processing blocks can process data in parallel in a pipelined fashion. For specificity, the depicted embodiment shows only two processing blocks 302, 304; however, it should be understood that signal flows with any number of nodes may be implemented. Data moves between the processing blocks 302, 304 and is temporarily stored in input/output buffers 306, 308, 310. A register bank 312 stores control parameters that monitor the fill state of the buffers 306, 308, 310 and trigger data flow between the buffers and processing blocks 302, 304—in other words, the register bank 312 controls the "switches" 220 between nodes. The input buffer 306 of the first processing block receives data from an internal or external data source 314, 316, such as memory, a camera providing image streams, or some other input device; a multiplexer 318 may facilitate selection between multiple such data sources. The output buffer 310 of the last processing node 304 sends data (optionally via another multiplexer 320) to an internal or external data sink 322, such as, e.g., memory or a display device.

In video- or image-processing applications implemented on a DSP or hardware (rather than in software executed on a general-purpose computer), the image frames are generally too large to be stored locally, and therefore reside in slower external memory (corresponding, in FIG. 3, to data source 316). Image data is loaded into the internal memory in rows or blocks. After these rows or data blocks have been processed in a series of processing blocks (e.g., blocks 302, 304), the generated output is likewise stored in the slower, external memory (corresponding to data sink 322, which may be the same memory as source 316). The movement of data to and from the external memory into the internal data buffers (e.g., buffers 306, 310) is preferably done through a DMA controller, which is an integral part of most DSPs and other special-purpose processors, and may, e.g., be implemented in the multiplexers 318, 320. The external data source and sink 316, 322 are, in this case, DMA-enabled. The DMA movement has the added advantage of parallelizing the data movement to and from the processor with the data processing itself; in other words, the data movement happens in the background.

The hardware embodiment of FIG. 3 is, of course, only one example. As will be readily apparent to those of skill in the art, signal flows in accordance with various embodiments of the invention can be implemented in a variety of ways. For example, a DSP may use a single processor core to execute sets of instructions, e.g., stored in local instruction memory, corresponding to the different nodes. Further, data buffers may share the same memory space and be created and/or overwritten on the fly as needed. The registers for controlling the switches between nodes may be hardware registers or, alternatively, be stored in local memory along with the buffers and/or instructions. Alternatively to a DSP, the signal flow may also be executed on any other kind of special-purpose processor, including, e.g., a microcontrollers, application-specific integrated circuits (ASICs), field-programmable gate arrays (FPGAs), or programmable gate arrays (PGAs). Moreover, signal flows in accordance herewith may be implemented in software executed on a general-purpose computer.

Figure 4A:
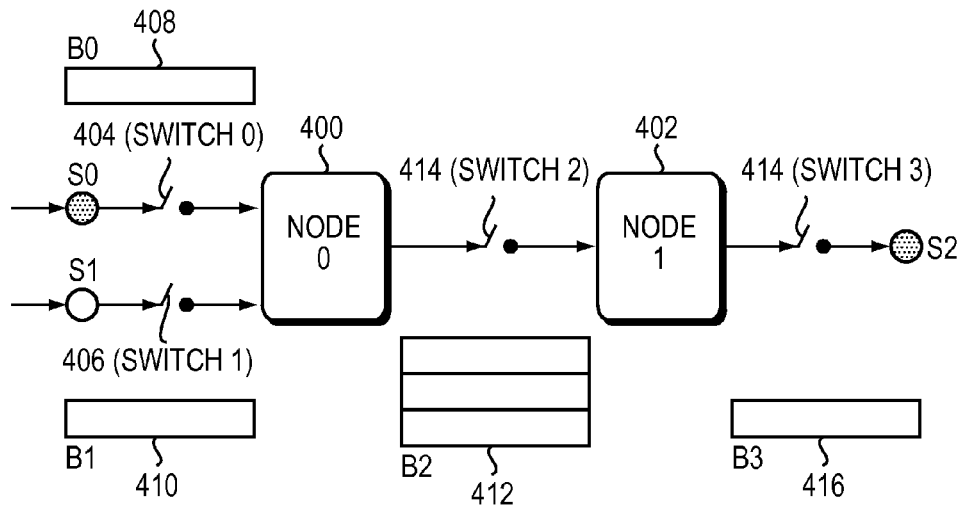
FIGS. 4A and 4B illustrate, respectively, a row-based signal processing flow incorporating switches between nodes, and registers that control the data flow and operation of the switches in accordance with various embodiments.
Figure 4B:
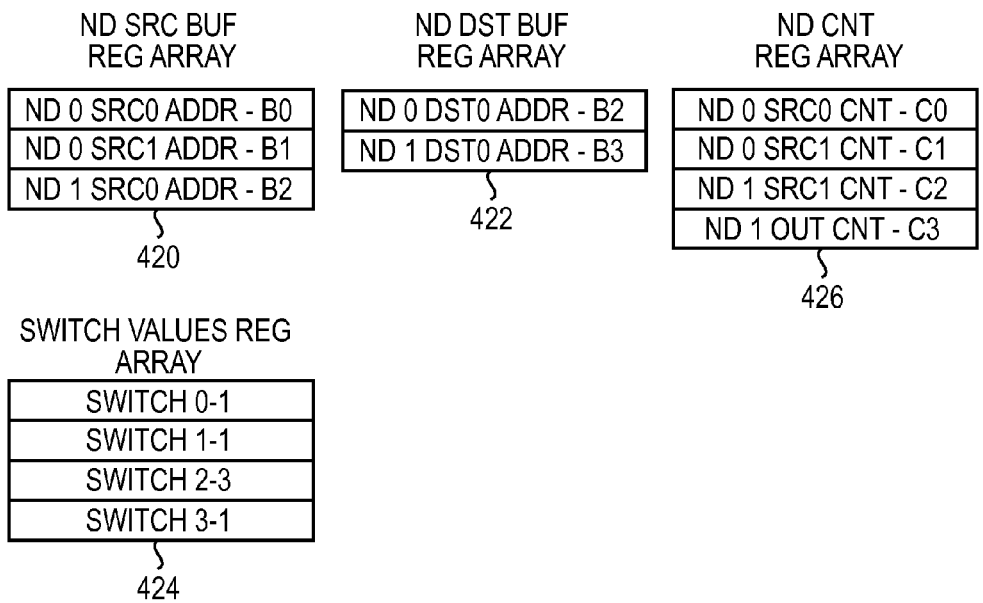

Returning to a hardware embodiment (as depicted, e.g., in FIG. 3), FIGS. 4A and 4B illustrate the operation of the switches as implemented by registers 312 in more detail. In the example shown, the signal flow (illustrated in FIG. 4A) includes two nodes 400, 402. Each of the nodes 400, 402 is associated with one- or two-dimensional data buffers at its input and output. Specifically, as shown, node 0 receives input from two DMA source nodes S0, S1, connected to the node via switches 404, 406, which feed its data buffers B0 and B1 (408, 410). The output of node 0 feeds a two-dimensional buffer B2 (412), which in turn is connected to the input of node 1 through a switch 414. The output of node 1 flows into data buffer B3 (416), which is connected to a DMA sink S2 via a switch 418.

The system maintains four different register arrays 420, 422, 424, 426, which collectively form the register bank 312 for controlling the signal flow through the nodes 400, 402. Each array may include a number of, e.g., 32-bit registers. A node-source address register array 420 includes a register for each input source of a node: in the example shown, two entries for the two input sources of node 0, and one entry for the input source of node 1. The entries in these registers are the addresses of the data buffers for the respective input sources, i.e., the addresses of buffers B0, B1, and B2. Once initialized, these register entries do not change throughout the entire signal processing. A node-destination address register array 422 includes a register entry for each output of a node: for example, one register for the output of node 0 and one entry for the output of node 1. The entries in these registers are the addresses of the data buffers for the respective outputs, e.g., buffers B2 and B3. For one-dimensional buffers at the output of a node, the values in the corresponding registers do not change once initialized. For two-dimensional buffers at the output (e.g., buffer B2 at the output of node 0), the entry is initialized to the value B2+$2^{nd}$ line (i.e., the initial buffer address in the register is the memory address of the $2^{nd}$ row in the buffer B2), and after the first iteration, the entry changes to B2+$3^{rd}$ line and remains the same thereafter. (The output of the previous node, which acts as input buffer for the current node, will always be written to the same memory address after the first iteration, hence it need not be updated. This simplifies the data movement across nodes which have 2D buffers. Note that the iteration depends on the size of the buffer. If the buffer is 3×M, then the iteration is 3/2=1, if 5×M, then the iteration is 5/2=2, etc.)

A switch value register array 424 determines when the control switch for each node closes: it stores, in each register, the minimum number of rows (or, more generally, units) of input data required in the input buffer of the respective node for the switch to close and execution of the node to be triggered. For example, the switch 404 connecting buffer B0 to node 0 requires that buffer B0 stores one row of data; this value is saved into the register. Switch 414 connect buffer B2 to node 1; the associated buffer requirement of three rows is stored in the appropriate register. Finally, in node count register array 426, each register entry is associated with a control switch for either an input source to a node or a DMA sink to which a node is connected. These register values are counters that track the number of rows of data processed by the respective node (and are, thus, updated by the node every time a row of input data has been processed), and control when the switch to the node closes. Initially, the register values C0, C1, and C3 for buffers B0, B1, and B3 are all zero, and the register value C2 for buffer B3 is one. (For two-dimensional buffers, the initial value may be selected to be the number of rows in the buffer divided by 2 and rounded down, resulting, for the instant example, in a value of round(3/2)=1.) Then, when DMA source node S0 fills buffer B0 with one row of pixels (or samples) and DMA source node S1 fills buffer B1 with one row of pixels, the values are updated to C0=1 and C1=1. The switch associated with each counter register closes when its value becomes equal to or greater than the value saved in the corresponding switch register. In pseudo-syntax, this corresponds to the following "if statement":

```
if(C0 >= SWITCH0 and C1 >= SWITCH1)
    {close switch 0 and switch 1; process node 0; increment C2 by 1}
if(C2 >= SWITCH2)
    {close switch 2; process node 1, increment C3 by 1}
```

Figure 5:
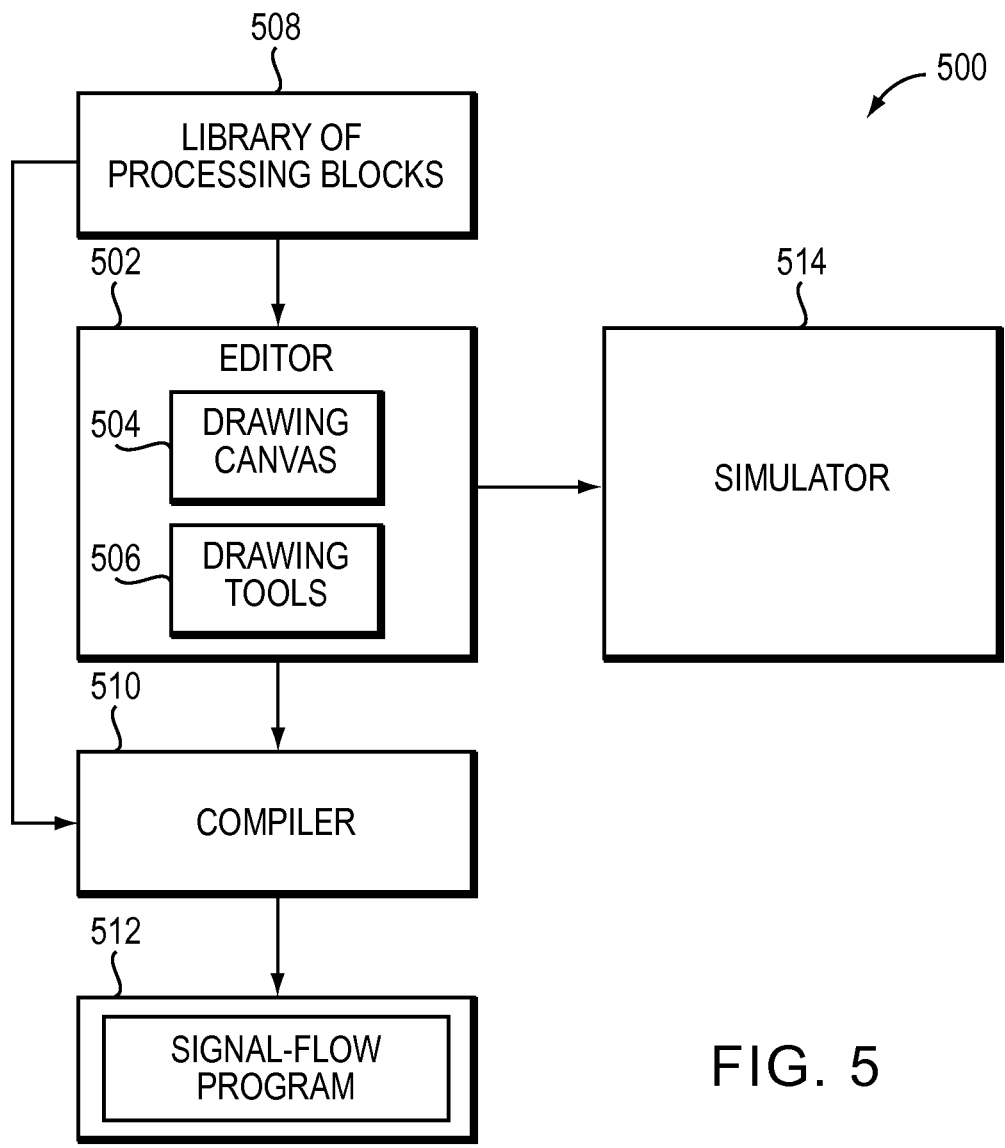
FIG. 5 is a block diagram illustrating a GUI-based tool for graphically defining signal flows and auto-generating code based thereon in accordance with one embodiment.

In various embodiments, the present invention provides a GUI-based tool that aids application programmers in the design and implementation of signal flows as described herein. As illustrated conceptually in FIG. 5, the GUI tool 500 includes an editor 502 having a drawing canvas 504 and associated drawing tools 506 that enable the programmer to generate a depiction of the desired signal flow. Further, the tool includes a library 508 of functions or procedures—i.e., self-contained sets of computer-executable instructions—that implement various discrete image-processing algorithms and, when selected, serve as the functional nodes, i.e., the processing blocks, of the signal flow. In some embodiments, each function or procedure has an icon or other graphical representation associated with it. The programmer may select desired functions or procedures from the library, e.g., by dragging and dropping respective icons onto the drawing canvas, and then connect them, e.g., by drawing lines between them, to define the signal flow. In alternative embodiments, the programmer defines the signal flow using generic shapes and symbols, and assigns the functions to the various symbols afterwards.

The functions may be optimized for a particular processor or a particular hardware implementation. In fact, in some embodiments, multiple versions of executable code, optimized for different hardware implementations, are provided for the same functionalities, allowing the program developer to select among them. Further, the functions or procedures may be inherently programmed for specific input block sizes and output unit sizes. Alternatively, the input and output blocks for each function or procedure may be variable in size, allowing the programmer to specify their sizes based on the particular application. In some embodiments, the library includes both functions for fixed-size data blocks and variable-size data blocks. In addition to the block size, other user-selectable parameters may also be associated with the various functional blocks.

The GUI tool 500 further includes a compiler 510 for automatically generating program code 512 that implements the desired signal flow from the graphical depiction. The compiler 510 incorporates the appropriate functions from the library 508, e.g., by linking or directly copying them into the program code 512, and adds the necessary instructions that govern data movement between the nodes. The compiler 508 may include a set of rules for translating graphical elements representing, e.g., connections, switches, and buffers, into suitable executable instructions. In some embodiments, the GUI tool is capable of supporting multiple programming languages; the library 508 includes, in this case, program code for each function in each of the supported languages. In certain embodiments, the GUI tool also includes a simulator 514 that allows the programmer to test the specified signal flow, e.g., to estimate certain performance parameters (such as, e.g., memory requirements, execution time on a particular processor, processing latencies, etc.). The simulator 514 may be integrated with the compiler 510.

Figure 6A:
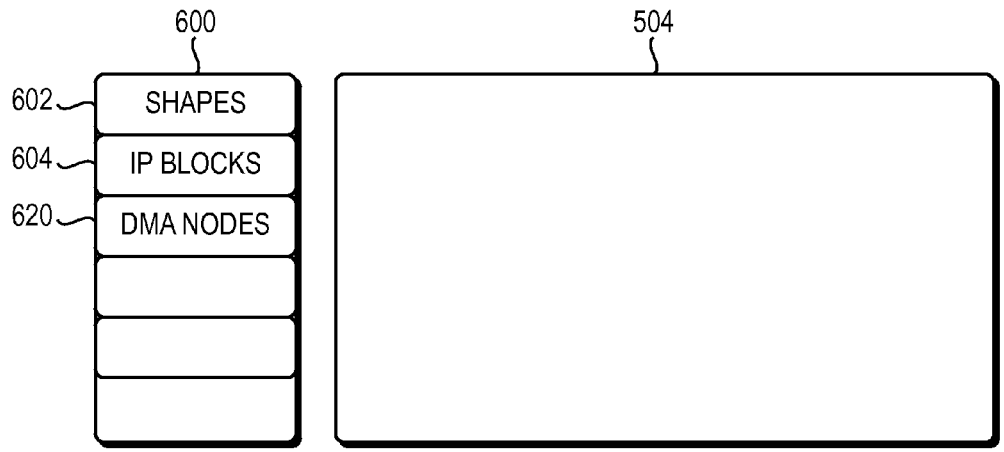
FIGS. 6A-6H illustrate user-interface components of a GUI-based tool in accordance with various embodiments.
Figure 6B:
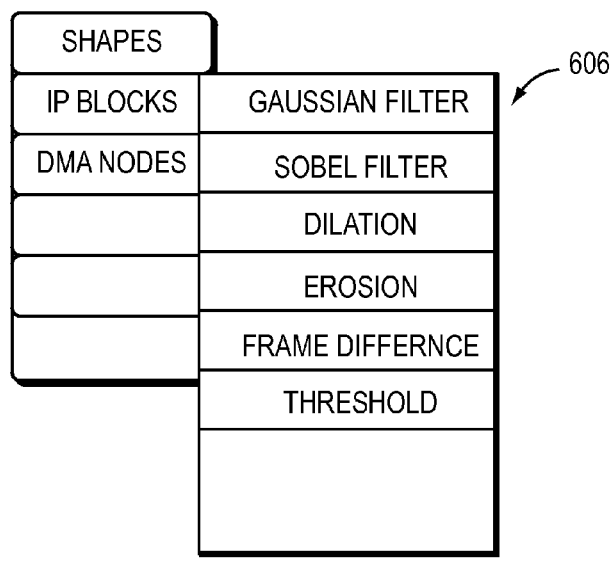
Figure 6C:
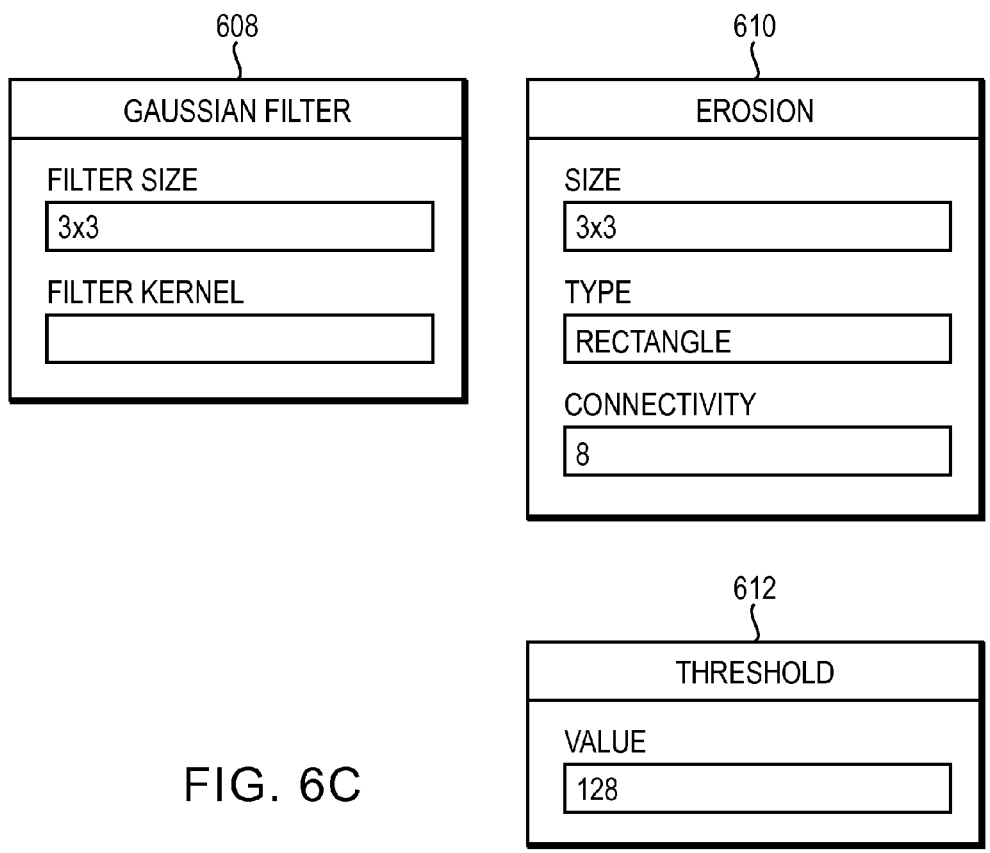

FIGS. 6A-6H illustrate an exemplary GUI for signal-flow programming in accordance with one embodiment. The GUI includes a panel 600 of tabs next to the drawing canvas 504. A "shapes" tab 602 may include different graphical elements such as lines, rectangles, etc., to draw the signal-flow schematic. Each of the nodes (as represented, e.g., with rectangles) in the schematic can be assigned to any of the image-processing (or other types of) functions available in the "IP blocks" tab 604. As shown in FIG. 6B, these functions may be provided, for example, as drop-down list 605. Once the image-processing function has been assigned to a node, the parameters for the function may be entered in a parameter window for that function. Parameter windows are implemented in the GUI in association with the various functions available in the library; FIG. 6C shows exemplary parameter windows 608, 610, 612 for three different image-processing functionalities.

The parameters specified by the user in parameter windows 606, 608, 610 (or, if unspecified, default values) are stored into a parameter list or array (e.g., a double pointer array or linked list) and passed on to the compiler 510. Typically, each node has one or more parameters saved into the list. For example, referring to FIG. 6C, if node 0 is for "thresholding" and node 1 for "erosion," then the first entry in the parameter list is saved from the parameter window 612 for node 0 and the next three entries are saved from the parameter window 610 for node 1. The compiler 510 uses the list of parameters to return values of the image-processing function associated with the respective node; these return values may, likewise, be stored in a list or array.

Figure 6D:
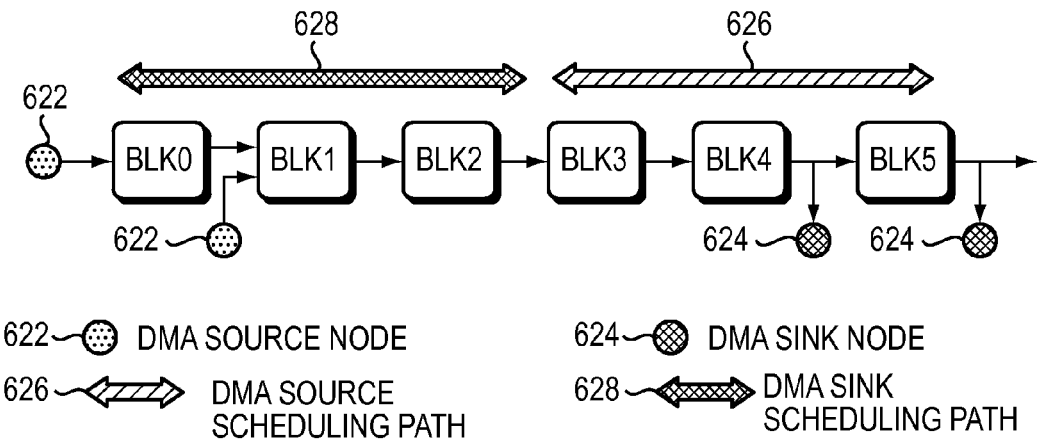
Figure 6E:
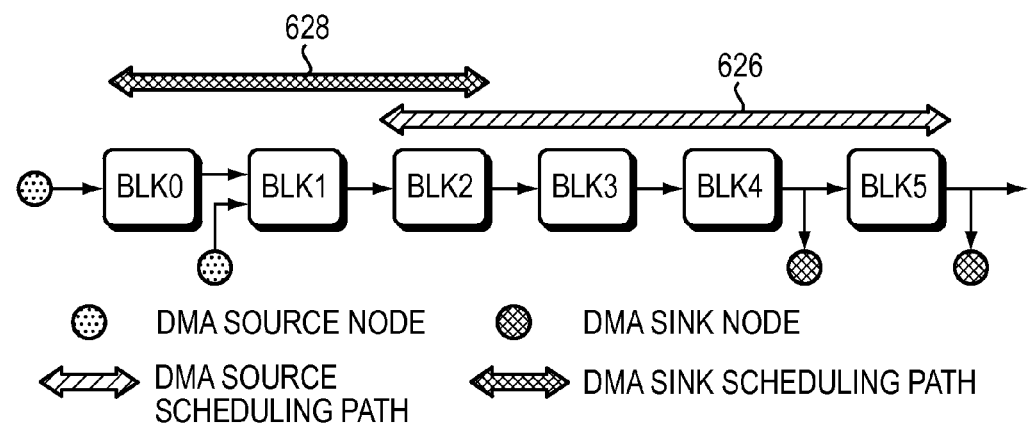
Figure 6F:
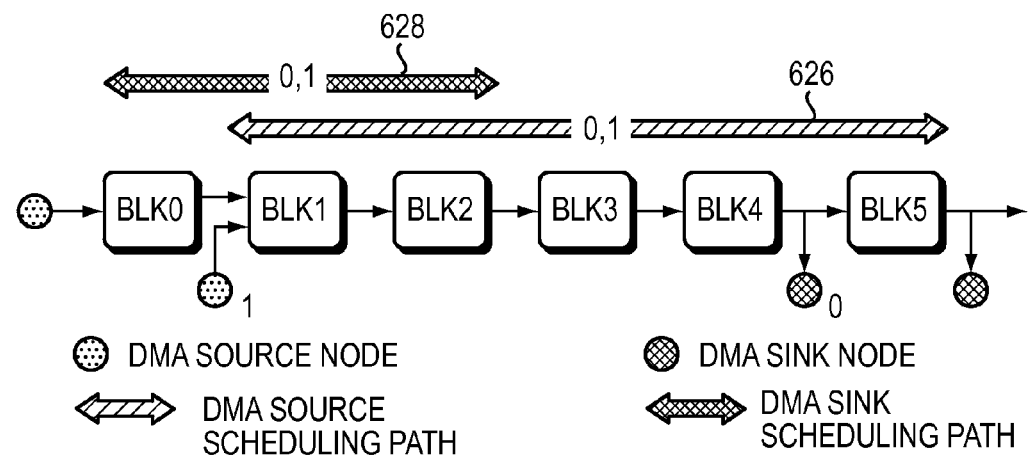
Figure 6G:
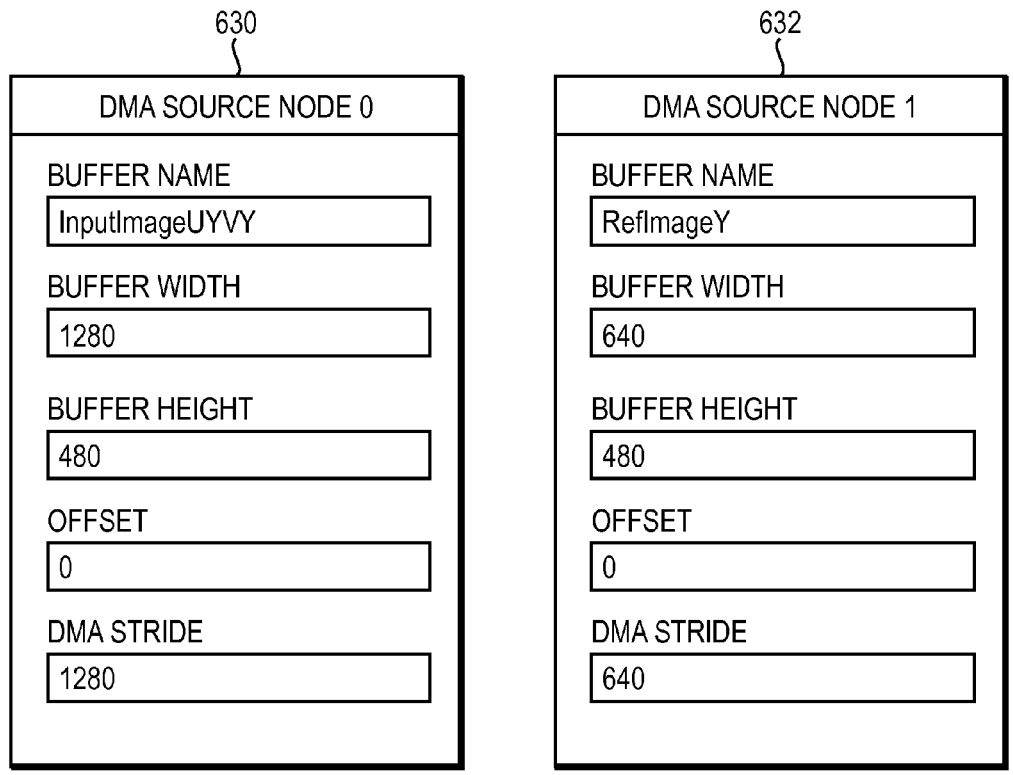
Figure 6H:
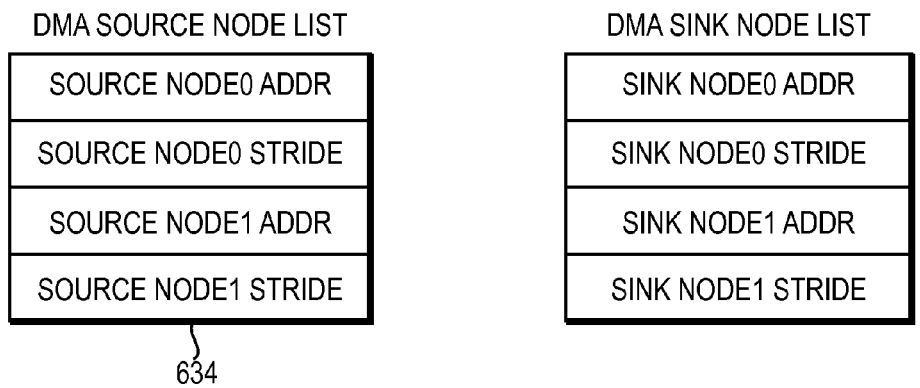

The panel 600 further includes a DMA tab 620 that allows the application developer to graphically define DMA movement and scheduling, as shown in FIGS. 6D-6F. The graphical DMA elements, such as DMA source and sink nodes 622, 624 and DMA source and sink scheduling paths 626, 628 have associated parameters that are subsequently used by the compiler 510 to generate suitable code governing DMA. Some of these parameters may be read directly from the graphical signal flow (e.g., the node in the signal flow to which a DMA node is connected), whereas others may be entered by the developer into a parameter window that pops up when the graphical DMA element is selected. For example, based on the user input in parameter windows 630, 632 for nodes 0 and 1, the compiler 510 may set up two register entries in a memory array for every node, as shown in FIG. 6H. More specifically, the compiler 510 may allocate memory for buffers with the name "Buffer Name" having dimensions "Buffer Width" and "Buffer Height." Then, it may set up two register entries in an array or list 634 for that node; the first entry is the address, which is auto-generated from the "Buffer Name" and "Offset" parameters, and the second entry is based on "DMA Stride". These lists are used to setup, start, and end the various DMA paths by the compiler 510. Thus, in various embodiments herein, DMA is an integral part of the GUI, and code for DMA movement and DMA scheduling is auto-generated from the graphical and/or textual user input, freeing the user of this otherwise tedious task.

The input required from the developer for generating DMA code generally includes an external-memory buffer address for each source or sink node, the stride to go to the next row or rows of the image/video buffer, and, optionally, the scheduling associated with one or multiple source/sink nodes as well as the processing nodes associate with each scheduling path. If the developer does not specify the scheduling, the compiler 510 may automatically generate a DMA scheduling path based on default rules. The compiler may also automatically assign dual ping-pong buffers to the source port of a node if that port receives parallel, overlapping input from a DMA node and the input buffer associated with that node.

DMA scheduling is illustrated further in FIGS. 6D-6F for an exemplary signal flow for an embodiment where a single processor cycles through the nodes. Herein, node 0 and 1 are associated with DMA source nodes, and nodes 4 and 5 are associated with DMA sink nodes. The DMA source nodes bring in data from external memory to the internal buffers, and the sink nodes drain data from the buffers to the external memory. Each of the DMA nodes is linked to either a source port or an output port of a processing node. The developer may specify the scheduling paths of the DMA sources and sinks (or else the compiler 510 will automatically find suitable scheduling paths). There can be one single path 626 for all the DMA source nodes and one path 628 for all the DMA sink nodes. The paths indicate when the DMA will start and end; for example, DMA associated with source nodes start before node 3 and ends after node 5, i.e., new data comes in through DMA while nodes 3 through 5 are processing while output is written out via DMA while nodes 1 through 2 are at work. Similarly, DMA for sink nodes starts before node 0 and ends after node 2. This type of scheduling is typical for embodiments where only a single DMA controller (or DMA-enabling hardware/peripheral) is associated with all the DMA nodes in the signal flow.

In alternative embodiments, multiple DMA controllers may be associated with the DMA nodes; in such a case, the DMA paths may overlap, as shown in FIG. 6E. In yet another case, shown in FIG. 6F, the DMA at the source port 1 and the buffer at source port 2 of node 1 overlap, i.e., when DMA is bringing in data from the next row into the buffer at source port 2, node 1 is also processing the data in the buffer at source port 2 for the previous row. This will lead to data parallelism or data corruption in the buffer at source port 2 for node 1. A dual-state ping-pong buffer (as are known to those of skill in the art) at the source port 2 of node 1 solves this problem, allowing processing of data by node 1 and DMA input at node 1 to proceed in parallel, but independently. The compiler 510 may automatically identify instances of such overlap and assign the dual-state ping-pong buffers to the affected source ports.

Figure 7:
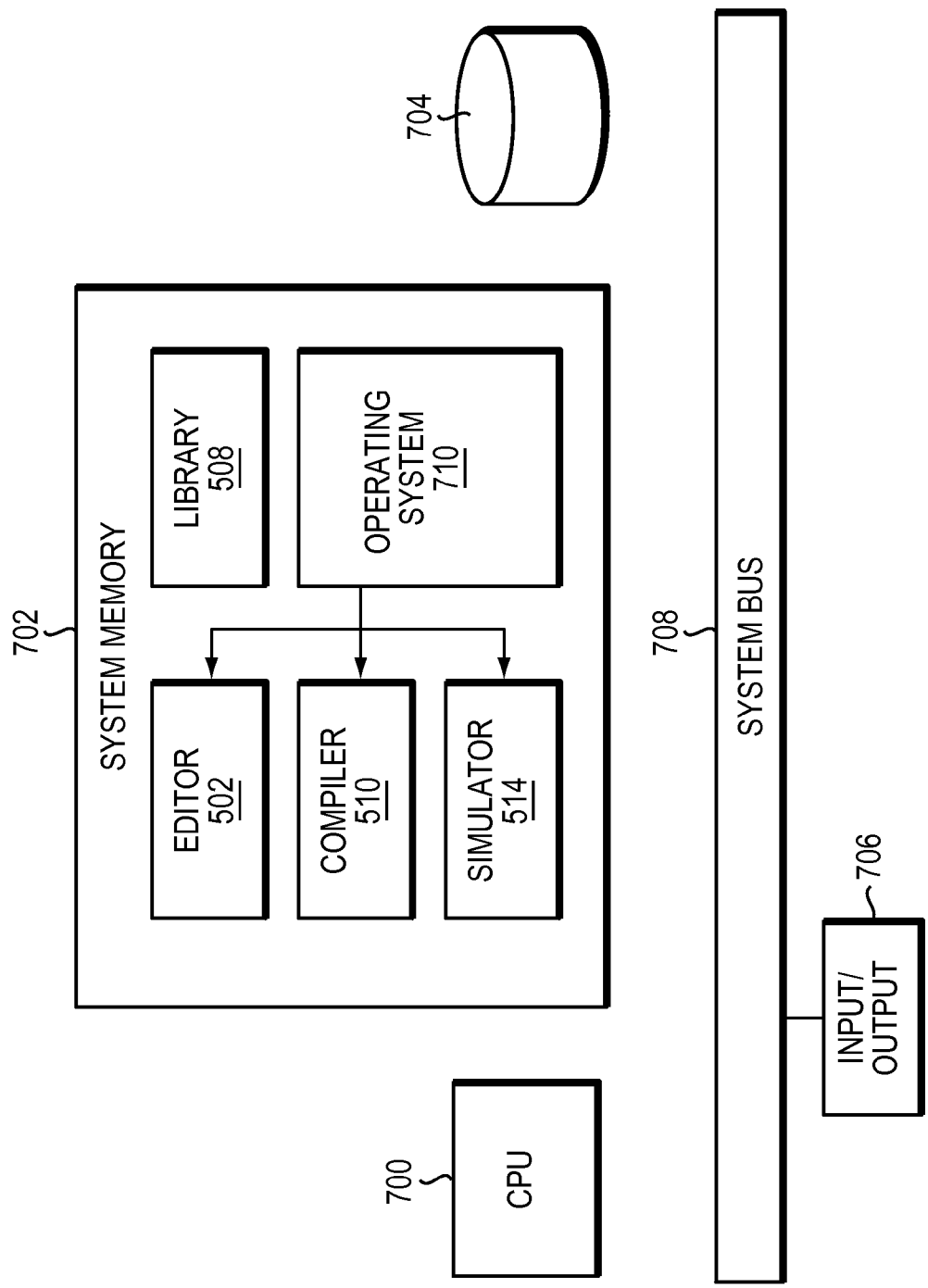
FIG. 7 is a block diagram illustrating a computer system for implementing the GUI-based tool of FIG. 5 in accordance with various embodiments.

A GUI tool 500 as described above may be implemented, e.g., in software executed on a general-purpose computer. FIG. 7 shows an exemplary computer embodiment, including a central processing unit CPU 700 and associated system memory 702, one or more non-volatile mass storage devices (and associated device drivers) 704, input/output devices 706 (such as, e.g., a screen, keyboard, mouse, stylus, etc.), and a system bus 708 over which the processor and memory communicate with each other and with the other system components. The system memory 702 stores instructions, conceptually illustrated as a group of modules, that control the operation of the CPU 700 and its interaction with the other hardware components. An operating system 710 directs the execution of low-level, basic system functions such as memory allocation, file management, and operation of storage devices 704. At a higher level, one or more service applications provide the computational functionality for auto-generating code based on a graphical signal-flow representation. These applications may include the editor 502, compiler 510, and simulator 514. Of course, these modules may be combined, further partitioned, or differently organized; as persons of skill in the art will appreciate, the instructions can generally be grouped and organized in many different ways. The system memory 702 may also store the library 508 of processing blocks. The instructions implementing the applications 502, 510, 514 may be programmed in any of a variety of suitable programming languages, including, without limitation, C, C++, Basic, Pascal, Fortran, or an assembly language.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A storage-efficient method for processing frame data, comprising:
   receiving, from a first processing node in a series of processing nodes implemented by one or more computing devices, data at an input buffer associated with a second processing node in the series, wherein the second processing node in the series is to perform an operation that requires an input that is a block of frame data of a first predetermined size to generate a block of frame data of a second predetermined size, and the first and second predetermined sizes each comprise a plurality of frame data samples;
   determining, by the one or more computing devices, that a size of the data in the input buffer is equal to the first predetermined size; and
   in response to determining that the size of the data in the input buffer is equal to the first predetermined size, causing, by the one or more computing devices, the second processing node to operate on the frame data in the input buffer to generate a block of frame data of the second predetermined size.

2. The method of claim 1, wherein the frame data is image frame data.

3. The method of claim 2, wherein the second predetermined size is one row of an image frame.

4. The method of claim 3, wherein the first predetermined size is multiple rows of an image frame.

5. The method of claim 1, wherein the first processing node is a direct memory access (DMA) source node.

6. The method of claim 1, further comprising re-using memory allocated to the input buffer for another buffer associated with another processing node in the series, wherein the another node is different from the first processing node and the second processing node.

7. The method of claim 1, further comprising causing operation of multiple processing nodes in the series in parallel.

8. The method of claim 1, further comprising causing operation of the processing nodes in the series sequentially.

9. The method of claim 1, wherein determining that a size of the data in the input buffer is equal to the first predetermined size comprises:
   maintaining a counter for the input buffer; and incrementing the counter in response to receipt of units of data from the first processing node.

10. A storage-efficient system for processing frame data, comprising:
    at least one computing device to provide first and second processing nodes, wherein the second processing node is to perform an operation that requires an input that is a block of frame data of a first predetermined size to generate a block of frame data of a second predetermined size, and the first and second predetermined sizes each comprise a plurality of frame data samples;
    an input buffer associated with the second processing node, wherein the input buffer is sized to store an amount of frame data that is greater than or equal to the first predetermined size; and
    a logic switching mechanism to cause execution of the second processing node, by the at least one computing device, to operate on the frame data in the input buffer when the input buffer stores an amount of data equal to the first predetermined size.

11. The system of claim 10, wherein the logic switching mechanism comprises a register to store, for the second processing node, a representation of the first predetermined size and a counter for a number of blocks of the first predetermined size presently stored in the input buffer.

12. The system of claim 11, wherein the register is a hardware register.

13. The system of claim 11, wherein the register is stored in local memory associated with the at least one processing device.

14. The system of claim 10, wherein the at least one computing device includes a digital signal processor.

15. One or more non-transitory computer readable media for generating program code for block-based processing of frame data from a graphical representation of a signal flow defined in a graphical user interface, wherein the one or more non-transitory computer readable media has stored thereon instructions that, in response to execution by one or more computing devices of a system, cause the system to:
    provide a library of functions to implement signal-processing nodes, wherein a first function of the library of functions is to require an input that is a block of frame data of a first predetermined size to generate a block of frame data of a second predetermined size, wherein the first and second predetermined sizes each includes a plurality of frame data samples;

provide an editor to enable a user to graphically define a signal flow comprising a plurality of nodes and connections therebetween, and to associate with each of the nodes one of the functions from the library; and provide a compiler to generate program code from the graphically defined signal flow and the associated functions, wherein a node in the graphically defined signal flow is associated with the first function, the program code is to cause, upon execution, operation of the node to generate a block of frame data of the second predetermined size in response to a determination that a size of data stored in an input buffer associated with the node is equal to the first predetermined size.

16. The one or more non-transitory computer readable media of claim 15, wherein the editor is to enable the user to graphically define direct memory access (DMA) of the signal flow.

17. The one or more non-transitory computer readable media of claim 16, wherein the editor is to enable the user to define at least one of a DMA source, a DMA sink, or a DMA scheduling path.

18. The one or more non-transitory computer readable media of claim 16, wherein the compiler is to generate program code implementing the graphically defined DMA.

19. The one or more non-transitory computer readable media of claim 15, wherein the instructions are further to cause the system to provide the graphical user interface to a display device for display.

20. The method of claim 1, wherein the second processing node is to provide the generated block of frame data of the second predetermined size to a direct memory access (DMA) sink node.

21. The method of claim 1, wherein the first processing node is to generate the block of frame data of the second predetermined size by performance of a filtering operation on the block of frame data of the first predetermined size.

22. The method of claim 1, wherein receiving, from the first processing node in the series of processing nodes, data at an input buffer associated with the second processing node in the series, comprises receiving a block of frame data having a size that is smaller than the first predetermined size.

23. The system of claim 10, wherein the second predetermined size is smaller than the first predetermined size.

24. The system of claim 10, wherein the first processing node is a direct memory access (DMA) source node.

25. The system of claim 10, wherein the first predetermined size and the second predetermined size are different sizes.

26. The system of claim 10, wherein the first predetermined size is a first number of rows and the second predetermined size is a second number of rows.

27. One or more non-transitory computer readable media having instructions thereon that, in response to execution by one or more processing devices of a computing system, cause the computing system to:

provide a first processing node; and provide a second processing node, wherein the second processing node is to receive, from the first processing node, data at an input buffer associated with the second processing node, wherein the second processing node in the series is to perform an operation that requires an input that is a block of frame data of a first predetermined size to generate a block of frame data of a second predetermined size, and wherein the first and second predetermined sizes each comprise a plurality of frame data samples;

determine that a size of the data in the input buffer is equal to the first predetermined size; and in response to a determination that the size of the data in the input buffer is equal to the first predetermined size, cause the second processing node to operate on the frame data in the input buffer to generate a block of frame data of the second predetermined size.

28. The one or more non-transitory computer readable media of claim 27, wherein the second predetermined size is an integer number of rows of an image frame.

29. The one or more non-transitory computer readable media of claim 27, wherein the first processing node is a direct memory access (DMA) source node.

* * * * *